3,105,277
EXPENDABLE PATTERN BONDING AGENT
Harry J. Pingry, Kokomo, Ind., assignor to Union Carbide Corporation, a corporation of New York
No Drawing. Filed Oct. 11, 1960, Ser. No. 61,841
6 Claims. (Cl. 22—195)

This invention relates to a bonding agent for waxes and plastics and, more particularly, to a bonding agent for joining components of expendable wax and plastic patterns for use in the "lost wax" process.

In the "lost wax" casting process a one-piece mold for receiving molten metal is made by first forming a pattern of the object to be cast and coating it with ceramic material to form a mold. The pattern is made of an expendable material such as wax or plastic and is alternately dipped in ceramic slurries and coated or stuccoed with ceramic particles until a shell of ceramic material is built up around the expendable pattern. The shell mold is then fired to hardness while the wax or plastic pattern material is burnt out or removed prior to the firing of the mold by other processes. The fired, hardened shell mold is left with a cavity having the configuration of the desired object and molten metal can now be cast into the mold.

In practice certain other wax or plastic parts are joined to the expendable pattern before it is subjected to the ceramic coating processes. Risers, gates, runners and other mold components are joined to form a pattern assembly. Often a number of patterns are joined together by runners to form a cluster of molds so that several parts can be cast with one pour of metal. When the assembly is covered with the ceramic coatings and the expendable material melted out, the runners leave passageways for the flow of molten metal to each of the mold cavities.

The individual components of these assemblies, patterns, risers, runners, etc., must be joined together before the assembly is coated with ceramic material. Prior methods for joining these parts included joining by fusion, and if possible, joining by bonding agents. Joining by fusion is less than satisfactory because the mating surfaces must be heated to a near liquid state before they are pressed together. Such heatings often produce distortions and do not always bond the parts effectively.

It would be most convenient to join these parts by means of a bonding agent but the problems involved and the demands necessarily made on the bonding agent are such that heretofore no satisfactory material was available for this purpose.

The parts to be joined may be of different materials, some being wax, others plastic. The bonding agent must have a thermal expansion rate compatible with that of the wax and plastic so that on heating of the mold the expansion of the bonding agent does not cause distortion or cracking of the mold. Furthermore the bonding agent must have a composition which, after burnout of the mold, does not leave residues in the mold which are harmful to the cast metal. The bonding agent must cure rapidly to full strength to allow use of production line techniques in the assembly of the pattern components. And most important of all, the bonding agent must have the necessary adhesive and cohesive properties for proper bonding of both wax and plastic parts.

It is the primary object of this invention therefore to provide a bonding agent for joining wax and plastic parts.

It is also an object of this invention to provide a bonding agent for joining the component parts of a wax or plastic pattern assembly to be used in the manufacture of a shell mold for the "lost wax" casting process.

Other aims and advantages of this invention will be apparent from the following description and the appended claims.

In accordance with these objects a bonding agent is provided for joining wax and plastic articles consisting essentially of from 20 percent to 40 percent by weight microcrystalline wax and the balance substantially all an ester gum and incidental impurities.

Microcrystalline waxes are hydrocarbon waxes derived by solvent separation from petroleum and are characterized by the fineness of their crystals in distinction to the larger crystals of paraffin wax. Microcrystalline waxes also have a higher melting point than paraffin waxes and are available with various melting points and hardnesses.

Ester gums are hard synthetic resins and are the reaction products of natural resins, such as rosin, or hydrogenated resins with polyhydric compounds such as glycerol and pentoerythritol. The esters of hydrogenated resins, for example hydrogenated rosin, are nonoxidizing. Small amounts of impurities which do not leave a residue on burning of the pattern may be tolerated in the ester gums or microcrystalline waxes.

Mixtures of ester gums and various waxes have been made in the past for various uses, generally as waterproofing agents and occasionally as bonding agents for use in laminations. The development of a satisfactory combination of adhesive and cohesive properties depends on the specific critical composition given above. In Table 1 properties of various ester gum-microcrystalline wax compositions are given.

TABLE 1

Effect of Composition Variations on Properties

| Examples | Composition, Weight Percent | | Evaluation | | | |
|---|---|---|---|---|---|---|
| | Ester Gum | Microcrystalline Wax | Adhesion | Cohesion | Hardness | Remarks |
| A | 90 | 10 | Excellent | Poor | Brittle | (¹) |
| B | 85 | 15 | ----do---- | Fair | ----do---- | Fair. |
| C | 80 | 20 | ----do---- | Good | Fair | Good. |
| D | 70 | 30 | ----do---- | Excellent | Optimum | Preferred. |
| E | 60 | 40 | Good | Good | Ductile | Good. |
| F | 45 | 55 | ----do---- | Fair | Soft | Fair. |
| G | 40 | 60 | ----do---- | Poor | Tacky | (¹) |

¹ Not recommended.

As is seen in Table 1 the preferred composition of the bonding agent is 70 percent by weight ester gum and 30 percent by weight microcrystalline wax. Compositions ranging from 20 to 40 percent microcrystalline wax and 60 to 80 percent ester gum are satisfactory. Compositions outside this range, however, are either too soft or too brittle for use as a bonding agent for wax or plastic. It is to be noted that these compositions outside the range of this invention are quite suitable for uses other than bonding agents such as sealing compounds, waterproofing materials, etc., because of their excellent adhesive properties. But for joining wax and plastic parts such compositions do not have the proper combination of adhesive and cohesive properties, as the results in Table 1 demonstrate.

The absence from the bonding agent of this invention of materials other than the microcrystalline wax and ester gum prevents the possibility of harmful residues being left in the mold cavity where they would contaminate the molten metal.

The bonding agent will join wax and plastic parts of many compositions. Wax parts may be joined to other wax parts, or to plastics; or plastic parts may be joined to other plastic parts. Wax parts which are effectively joined by this bonding agent include parts made of paraffin waxes, microcrystalline waxes, synthetic waxes, natural waxes and blends of these waxes. Plastics which may be joined by means of this bonding agent include polystyrene of all grades as well as many other plastics and resins.

In the practice of the invention a bath of molten bonding agent is maintained and one or both of the parts to be joined are coated with the bonding agent by a dipping into the bath or by brush application. The parts are joined, pressed together, and in a few seconds, the bond is strong enough to permit normal handling of the assembly.

A coating thickness of from about 0.01 inch to 0.03 inch, and preferably from 0.020 to 0.025, between the parts will produce the best bond. To achieve such a coating thickness and to maintain the optimum properties of the bonding agent, it is necessary to control the temperature of the bath of bonding agent. In Table 2 there is shown the relationship between the bath temperature and the coating thickness produced on an article dipped into the bath.

TABLE 2

*Effect of Bath Temperature Variation on Preferred 70–30 Composition*

| Bath Temperature, °F. | Coating Thickness, Inch | Overall Evaluation | Remarks |
| --- | --- | --- | --- |
| Less than 200 | Over .075 uneven. | Fair | Viscous, low adhesion. |
| 200–250 | .025–.075 | Good | Slightly viscous, good properties. |
| 250–275 | .020–.025 | Excellent | Optimum characteristics. |
| 275–300 | Under .020 | Good | May decompose after prolonged heating—good properties. |
| Over 300 | Under .020 | Fair | Decomposes after prolonged heating. |

As shown in Table 2 there is an effective bonding when the bonding agent is applied within the temperature range 200° F. to 300° F. At temperatures below 200° F. the bath is very viscous with reduced adhesion properties. At temperatures between 200° F. and 250° F., the bonding agent has good bonding characteristics, but the thickness of the coating is not always uniform. The temperature range of 250° F. to 275° F. provides the proper thickness in the coating produced on an article dipped into the bath.

When both parts are to have their mating surfaces coated with bonding agent to produce an extra strong bond, a slightly less viscous bonding agent may be needed so that the coating thickness will not be too great. This may be accomplished by heating the bath of bonding agent to the high side of the effective 200° F. to 300° F. temperature range. The less viscous bonding agent will form a thinner coating on each part so that the overall coating thickness will be in about the indicated range. Other factors involved in the coating thickness are the extent of cooling or hardening time before the coating parts are pressed together and also the amount of force used when they are pressed together. Such considerations are to be included when designing a process for bonding parts of given configurations. Other variables involved are the size and shape of the objects. A male part to be inserted in an opening may need a slightly less thick coating than a joint made up of abutting surfaces.

Very often the parts may be designed to include space for the bonding agent. This allowance for bonding agent is important where the pattern itself is made up of two or more parts. Many patterns because of size and configuration must be so made. In this case the parts are prepared to be held in jigs while drying to maintain the proper dimensional control.

The strength of the joint developes within a few seconds and in 45 seconds is sufficient to allow general handling. The material does not harden to a brittle state but remains very ductile and strong.

When a wax or plastic part is found to be improperly shaped or dimensioned it is possible using this bonding agent to build up a new surface by applying several coats of bonding agent, drying each coat, to the surface to be repaired.

The bath of bonding agent may be maintained at 275° F. and up to 300° F. for extended periods of time without any chemical alteration of the bath. After 336 hours at 265° F. a quantity of the bonding agent of the preferred composition was found to be unaffected. Above 275° F. but below 300° F. the bath evolves a small quantity of smoke, which indicates that the material may become chemically altered when heated for prolonged periods of time. It is therefore recommended that the temperature of the bath be not higher than 300° F.

When the critical bonding agent composition is used at the proper application temperature a bond stronger than the component parts is produced. The use of this bonding agent has made possible the fabrication of larger molds because of the increased strength of the joints. This has allowed the extension of the "lost wax" casting process to the manufacture of castings much larger than heretofore attempted.

In addition the ease of the bonding operation has resulted in considerable labor and time savings over the more involved fusion joining methods. Furthermore the higher strength of the joints in the mold clusters produced according to this invention has greatly reduced the amount of breakage on the production line conveyors.

As an example of the operation of the invention a bonding agent was used in the large amount involved in one company's "lost wax" casting process. The bonding agent was composed of about 70 percent by weight of an ethylene glycol ester of hydrogenated rosin and about 30 percent of a microcrystalline hydrocarbon wax extracted from mid-continent petroleum crude. The agent was prepared by adding chunks or bars of the proper weights of microcrystalline wax and ester gum to a heated container. The temperature of the mix is first brought up to 300° F., with continuous stirring, to ensure proper mixing. The mix is then cooled to the temperature of application. A large batch may be so prepared and then solidified for storage and later use.

In use the bath of molten bonding agent was maintained at about the preferred temperature of 275° F. The pattern parts to be joined varied, some being composed of a microcrystalline blended wax and others being composed of polystyrene. The parts were assembled into mold clusters each containing several individual casting patterns. The use of the bonding agent resulted in a 50 to 60 percent reduction in cost of the joining operation on the "lost wax" process production line. Furthermore the number of molds broken on the conveyor lines was greatly reduced.

What is claimed is:

1. A method of joining parts composed of materials selected from the group consisting of waxes and plastics comprising applying to the mating surfaces of said parts a bonding agent consisting essentially of from 20 percent to 40 percent by weight microcrystalline wax and the balance substantially all an ester gum and incidental impurities, said bonding agent being applied at a temperature of from 200° F. to 300° F., and pressing the mating surfaces together.

2. A method of joining parts composed of materials selected from the group consisting of wax and plastics comprising applying to the mating surfaces of said parts a bonding agent consisting essentially of about 30 percent by weight microcrystalline wax and the balance substantially all an ester gum and incidental impurities, said bonding agent being applied at a temperature of from 200° F. to 300° F. in a coating thickness between the parts of from about 0.01 inch to 0.03 inch, and pressing the mating surfaces together.

3. A method of joining component parts of a pattern assembly to be used to form a mold for the "lost wax" casting process, said parts being composed of materials selected from the group consisting of waxes and plastics, comprising applying to the mating surfaces of said parts a bonding agent consisting essentially of from about 20 percent to 40 percent by weight microcrystalline wax and the balance substantially all an ester gum and incidental impurities, said bonding agent being applied at a temperature of from 200° F. to 300° F., and pressing the mating surfaces together.

4. A method for joining component parts of a pattern assembly to be used to form a mold for the "lost wax" casting process, said parts being composed of materials selected from the group consisting of waxes and plastics, comprising applying to the mating surfaces of said parts a coating of a bonding agent consisting essentially of about 30 percent by weight microcrystalline wax and the balance substantially all an ester gum and incidental impurities, said bonding agent being applied at a temperature of from 200° F. to 300° F., and pressing the mating surfaces together.

5. A method for joining component parts of a pattern assembly to be used to form a mold for the "lost wax" casting process, said parts being composed of materials selected from the group consisting of waxes and plastics, comprising applying to the mating surfaces of said parts a coating of a bonding agent consisting essentially of about 30 percent by weight microcrystalline petroleum wax and the balance substantially all an esterified hydrogenated rosin and incidental impurities, said bonding being applied at a temperature of about 275° F., and pressing the mating surfaces together.

6. The method of claim 5 wherein the coating of bonding agent between the pattern parts is from 0.020 to 0.025 inch thick.

References Cited in the file of this patent
UNITED STATES PATENTS

| | | |
|---|---|---|
| 1,968,907 | Pearsall | Aug. 7, 1936 |
| 2,141,575 | Warp | Dec. 27, 1938 |
| 2,387,529 | Pearsall | Oct. 23, 1945 |
| 2,461,416 | Erdle et al. | Feb. 8, 1949 |
| 2,752,263 | Pierce | June 26, 1956 |